Apr. 10, 1923.
A. T. BROWN
1,451,140
AGRICULTURAL MACHINE
Filed Aug. 31, 1918 4 sheets-sheet 1
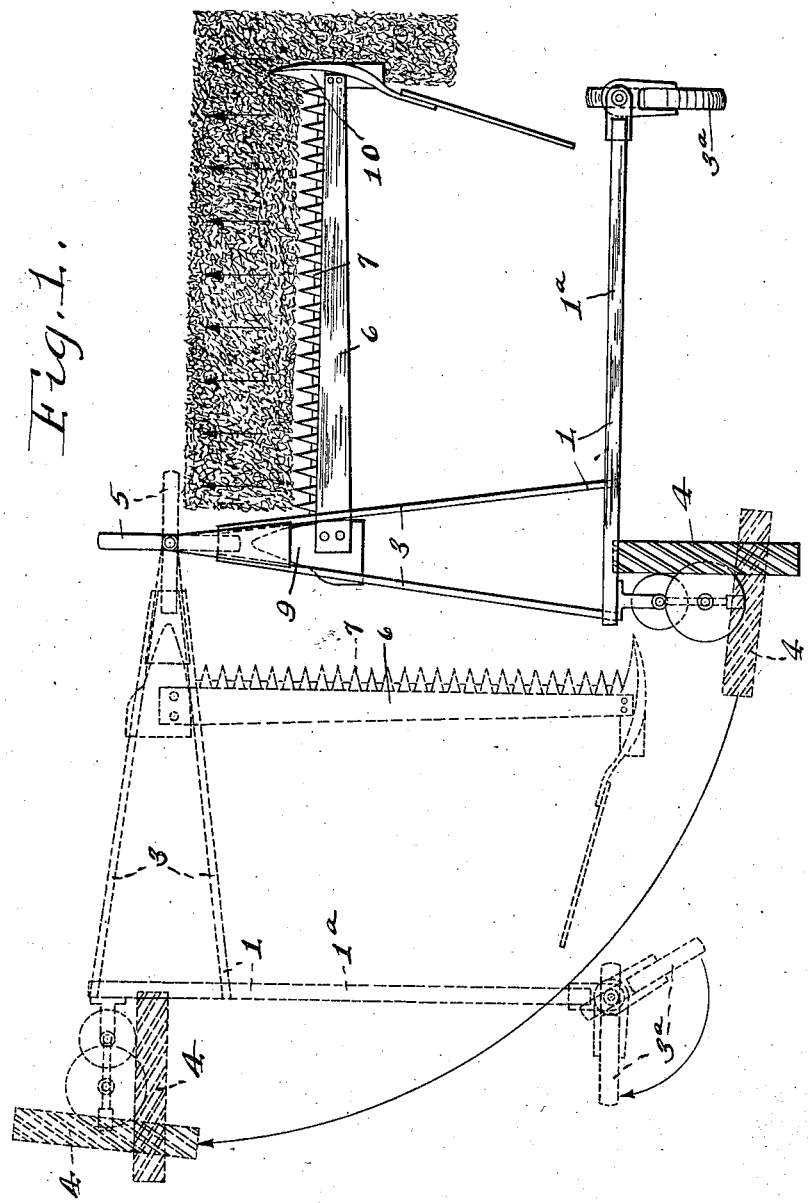
INVENTOR
Alexander T. Brown.
BY
Parsons & Bodell
ATTORNEYS.

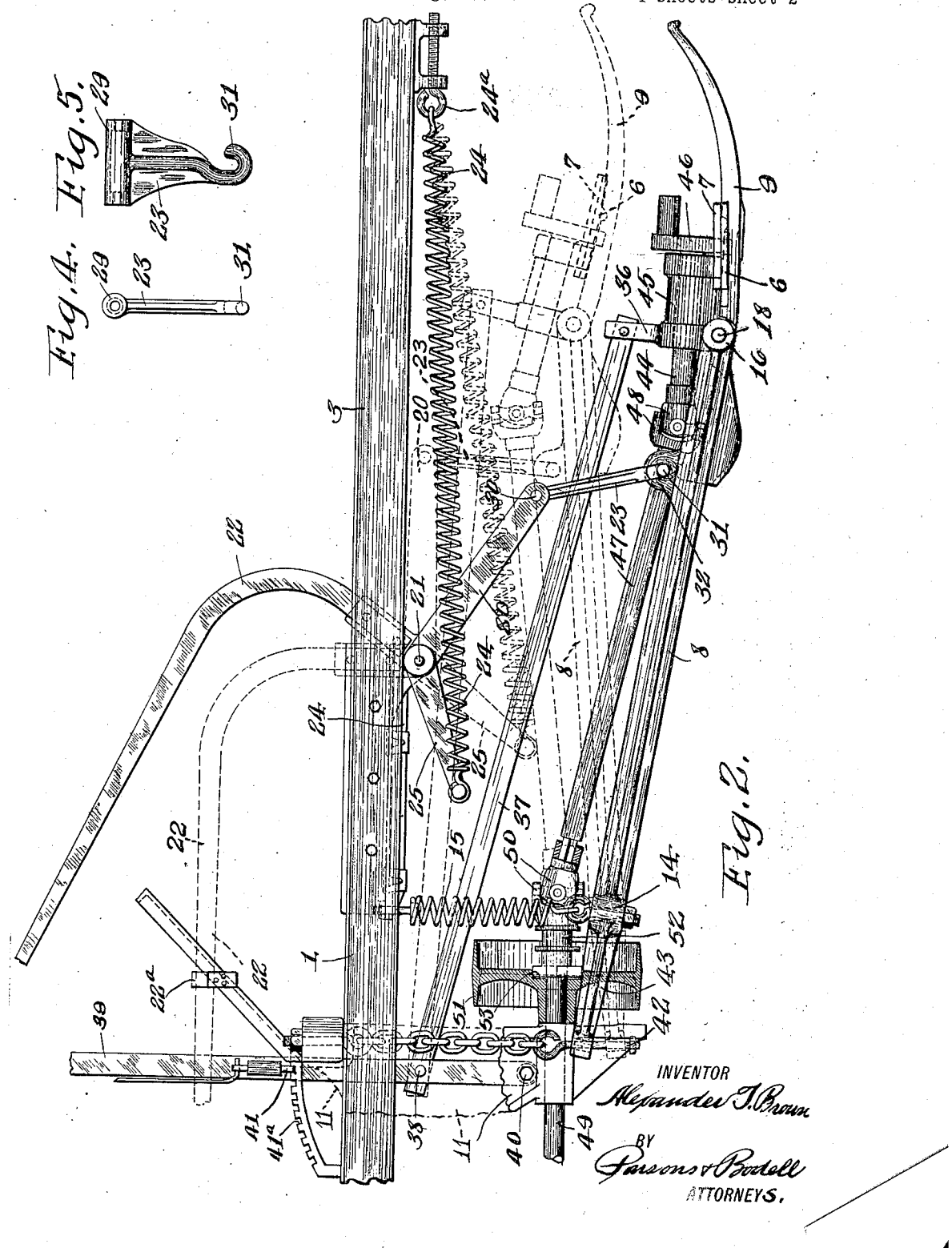

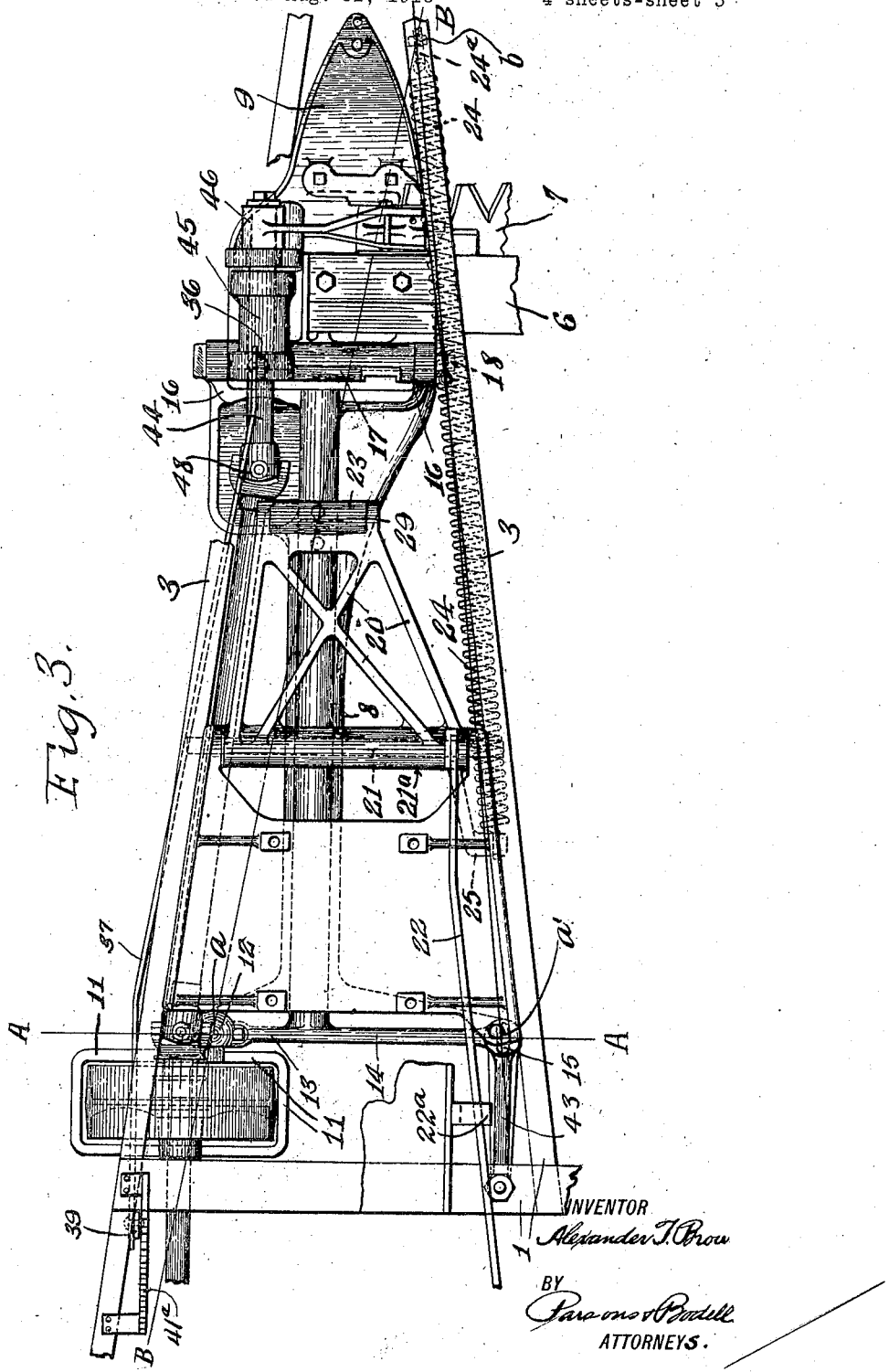

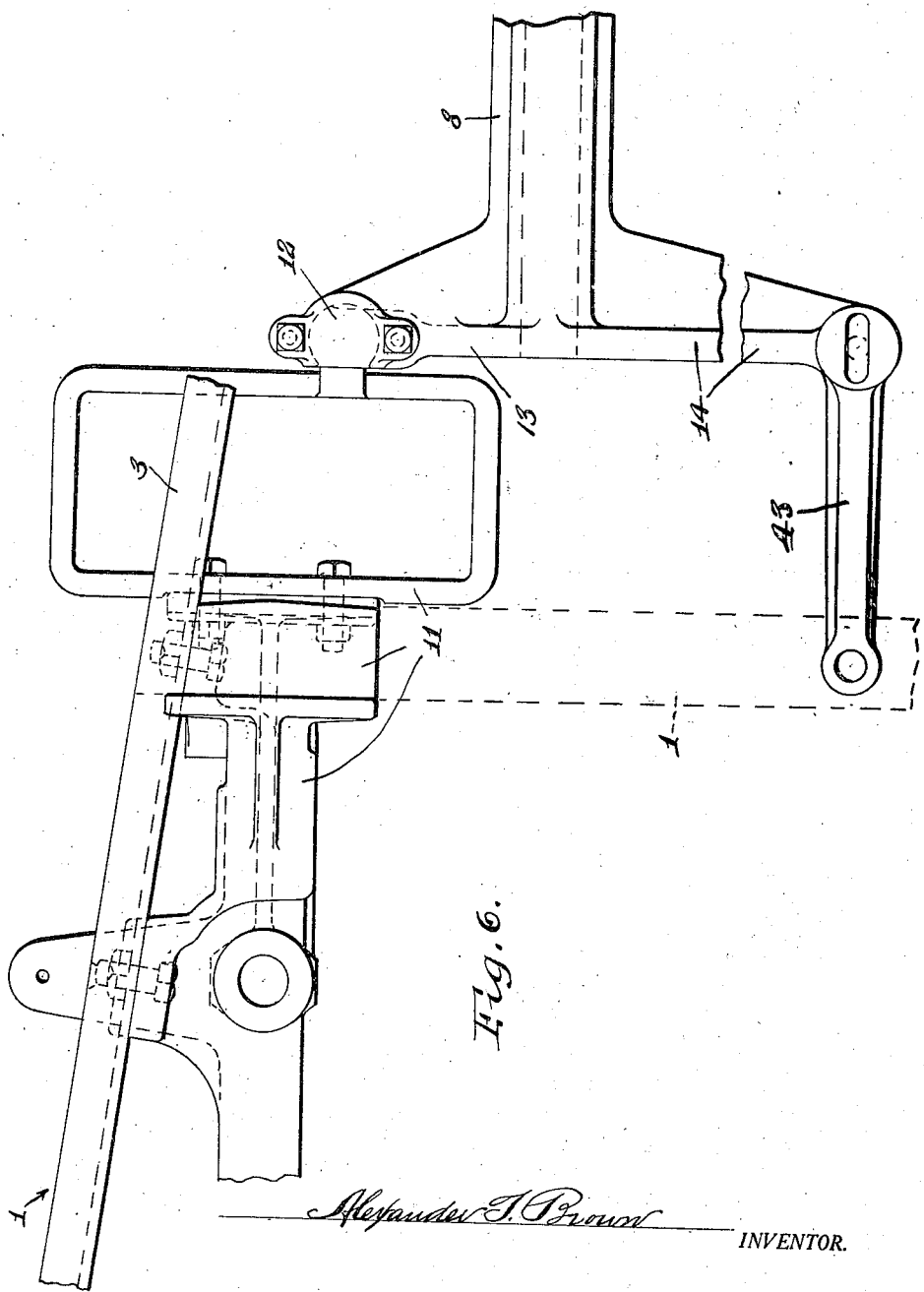

Patented Apr. 10, 1923.

1,451,140

UNITED STATES PATENT OFFICE.

ALEXANDER T. BROWN, OF SYRACUSE, NEW YORK.

AGRICULTURAL MACHINE.

Application filed August 31, 1918. Serial No. 252,215.

*To all whom it may concern:*

Be it known that I, ALEXANDER T. BROWN, a citizen of the United States, and a resident of Syracuse, in the county of Onondaga and State of New York, have invented a certain new and useful Agricultural Machine, of which the following is a specification.

This invention relates to agricultural machines and has for its object a particularly simple and efficient means for supporting the tool of the implement and shifting the position thereof relatively to the work; and the invention consists in the novel features and in the combinations and constructions hereinafter set forth and claimed.

In describing this invention, reference is had to the accompanying drawings in which like characters designate corresponding parts in all the views.

Figure 1 is a plan view of a mower embodying my invention, parts being omitted, the mower being shown in dotted lines in its position occupied when turning a corner.

Figure 2 is a fragmentary side elevation of the implement, the support therefor and the means for operating the support.

Figure 3 is a plan view of parts seen in Fig. 2, parts being omitted.

Figures 4 and 5 are detail views of one of the links forming a part of the lifting mechanism for the implement support.

Figure 6 is a fragmentary view illustrating the joint between the carrier and the knife and the frame.

The implement to which my invention is applied is of the type described in my Patent No. 1,247,073 issued Nov. 20, 1917, which shows one form of mower to which my improved means for supporting the knife and finger bar is applicable.

This agricultural machine in so far as this invention is concerned, comprises an implement consisting of a cutting member which hangs or floats in substantially horizontal position when in use, a support for said member operable to shift the same to follow the contour of the ground, the implement being movably connected to its support, means for operating the support to elevate or lower said member, and means for guiding the horizontally extending member relatively to its support and to the work.

As will be understood by those skilled in the art, the knives and finger bars of mowers are supported in many ways from the frame so that their outer ends are free to move up and down or to be raised and lowered by hand to avoid obstructions on the ground, such bars being connected to the frame at their inner ends. This invention relates to means applicable to any mower for supporting the finger bar and knife. In Fig. 1, is shown one type of mower embodying my invention, and it may be applied to any type of mower to support the cutter bar thereof.

1 designates the frame which may be of any form, size and construction, it being here shown as including a main portion and a forwardly extending portion, here illustrated as consisting of bars 3. The illustrated machine is designed to be motor driven and includes a tractor wheel 4, and a steering wheel 5 both operable in any suitable manner, although my invention may be applied to a horse or tractor drawn machine. The frame also includes a laterally extending part 1ª here shown as arranged behind the cutting member or finger bar and knife and supported at its end by a caster wheel 3ª. As the operation of these wheels forms no part of this invention, further description is thought to be unnecessary.

The implement in this embodiment of my invention is a mower consisting of a laterally extending member as a finger bar 6 which cooperates with a reciprocating knife 7 in the usual manner. The knife may be reciprocated in any suitable manner, it being actuated as hereinafter described.

8 is the support or carrier for the mower knife, this support being mounted to be shifted vertically to carry the finger bar upwardly and downwardly in order to follow the contour of the ground. The finger bar is adjustably carried by its support in order to tilt the bar about its lengthwise axis to change the angle of the bar and knife by raising or lowering the cutting edge relatively to the work, and means is provided for tilting the finger bar about its axis during raising and lowering of the finger bar as it is travelling over the ground.

The carrier 8 is supported from the frame at three points located at the angles of a triangle, it being connected at one of these points to the frame by a joint having a universal action and at the other two points by spring means arranged to act on the support to yieldingly carry the inner and outer ends of the finger bar so that the shoes or runners 9 and 10 at the ends of the bar lightly engage or float easily over the ground.

As here shown, the support 8 extends forwardly and rearwardly of the frame bars 3, beneath said bars, and is connected to the frame to move about two horizontally extending axes, A—A and B—B, one A—A extending transversely relatively to the frame substantially parallel to the finger bar and the other, B—B extending lengthwise of the frame at an angle to one end of the finger bar.

The support or carrier 8 is in this embodiment of my invention, shown as connected to a bracket 11 depending from the frame bars 3, by a universal joint 12; and spring means which yieldingly carry the support are connected to the support at points remote from the joint 12.

In this embodiment of my invention, the support or carrier 8 is provided with laterally extending arms 13, 14 extending in opposite directions therefrom, the arm 13 being connected to the bracket 11 by the joint 12, which is preferably a ball-and-socket joint and the arm 14 being supported by a spring 15 connected to the outer end thereof, and to the frame, the spring being located substantially in or near the vertical plane of the transverse axis A—A of the support or carrier 8.

The support or carrier 8 is formed with a yoke 16 at its front end lapping opposite ends of a bearing 17 on the inner shoe 9 of the finger bar, and is connected to the bearing 17 by a pivot 18 extending through the yoke arms and the bearing 17, the pivot 18 extending in a direction lengthwise of the finger bar and substantially parallel to the transverse horizontal axis A—A of the support or carrier 8.

The front portion of the support or carrier 8 is movable vertically about the transverse axis A—A of the joint 12 and is supported by means here shown as comprising an arm or frame lever 20 pivotally mounted on a transverse axis 21 on the main frame between the arms 3—3 parallel to the transverse axis A—A of the support or carrier 8, a lever 22 mounted on said axis 21 and connected to the hub or bearing of the lever 20, a link 23 connecting the front end of the lever 20 and the carrier 8 and a spring 24 arranged to yieldingly support or suspend the front portion of the carrier 8, the spring being connected at one end to a fixed point at 24ª and at its other end to a lever arm 25 projecting rearwardly from the hub of the frame lever 20. The bearing 21ª of the arm or frame lever 20 is comparatively long.

When the finger bar carrier 8 is in its lower position as indicated in full lines, Fig. 2, the spring 15 yieldingly supports the carrier 8 at its inner end permitting it to rise and fall during the travel of the finger bar, in other words, it permits the finger bar to float over the ground.

When the lever 22 is operated into the position shown in dotted lines Fig. 2 into engagement with the suitable catch 22ª on the frame, the support 8 is positively or unyieldingly held in its lifted position. This catch 22ª is here shown as mounted on one edge of the inclined floor board or foot rest. When the support 8 is lowered it is supported at its inner end by the spring 24 and the lever 22 oscillates during the movement of the finger bar as the same is floating over the ground. Thus, the support or carrier 8 is supported at three points located at the angles of a triangle a—a′, a—b, a′—b, Fig. 2 and the springs 15 and 24 yieldingly support the outer and inner ends of the finger bar so that the shoes 9 and 10 rest but lightly on the ground. The triangle is indicated by the lines a—a′, a—b, a′—b, Fig. 3.

The link 23 is formed with a bearing 29 mounted on a shaft 30 at the front end of the arm 20 and is provided with a hook 31 at its lower end which enters an eye 32 on the carrier 8, the hook and eye constituting a universal joint which permits the lifting movement of the support 8 about the transverse horizontal axis A—A and any other transvers axis of the universal joint 12, and also the rocking movement of the support about the lengthwise axis B—B of said joint to arrange the knife out of horizontal position.

The finger bar and knife are moved about the axis 18 relatively to the work at different elevations of the bar during the raising and lowering of the support 8 about its transverse axes by suitable means. As here illustrated, the finger bar is provided with an upwardly extending lever arm 36 rigid therewith to which one end of a link 37 is connected, the other end of the link being pivoted at 38 to a lever 39. The lever 39 is pivoted at its lower end at 40 to a bracket 11 depending from the frame and is adjustable on its pivot 40 to different angles in order to change the angular position of the knife edge with respect to the work.

Owing to the arm 36 and link 37, the knife will automatically tilt about its axis during raising and lowering of the carrier 8 by the lever 22, or during the rise and fall of the finger bar as it floats over the ground.

The lever 39 is provided with a suitable lock 41 co-operating with the rack 41ª on the frame for holding the lever in its adjusted position.

Means is provided for the carrier 8 in order that the finger bar may be positively lifted by the lever 22 instead of yieldingly lifted by the spring 15 in the event the outer end of the finger bar is held or retarded in its lifting movement so that the spring 15 fails to act.

Said means as here shown comprises a fulcrum 42 arranged to come into coaction with the support 8 when the lever 22 is operated sufficiently to lift the front end of the support 8 and the inner end of the finger bar, a predetermined distance and the spring 15 instead of contracting remains under tension.

As here shown, the fulcrum 42 is arranged at the rear of the transverse axis A—A or outside of the side of the triangle passing through the joint 12 and the point of connection of the spring 15 and the carrier 8, and coacts with the rearwardly extending arm 43 on the carrier 8, and hence when the lever 22 is operated to lift the front end of the support and to bring the rear end of the arm 43 into engagement with the fulcrum, additional pressure on the lever 22 causes it to positively lift the outer end of the finger bar free of any obstruction tending to hold the same from lifting, the support 8 moving about a rearwardly inclined transverse axis passing through the joint 12 and the fulcrum. The movement of the support about the rearwardly inclined axis causes the outer end of the bar to lift relatively to the inner end.

The means for actuating the knife comprises a shaft 44 journaled in a bearing 45 on the shoe 9 at the inner end of the finger bar and having a crank 46 connected to the knife to reciprocate the same, a shaft 47 extending lengthwise of the carrier 8 and connected at its front end to the shaft 44 by a universal joint 48 and at its rear end to a drive shaft 49 by a universal joint 50 located near the ball and socket joint 12 connecting the carrier 8 to the frame. The shaft 47 is slidable axially relatively to the joint 50 during the up and down movements of the carrier 8. The shaft 49 has a driving pulley 51 thereon which is connectible to and disconnectible from the shaft by a sliding clutch section 52 rotatable with the shaft 49 and shiftable axially thereon by a suitable lever into and out of connection with clutch teeth 53 on the hub of the pulley.

The crank pin of the crank 46 is connected to the reciprocating knife in any well known manner as by a pitman. As a pitman and crank for actuating the knife of mowers forms no part of this invention, and as it is old and well known to those skilled in the art, it is thought that further description and illustration are unnecessary.

What I claim is:

1. In an agricultural machine, a frame, a horizontally extending implement shiftable up and down relatively to the frame, and a support for the implement connected to the frame at a plurality of points and being hinged to the frame to have a universal action at one of said points and spring means connecting the frame and the support at another point, substantially as and for the purpose described.

2. In an agricultural machine, a frame, an implement shiftable relatively to the ground, and a support for the implement movably carried from the frame at three points arranged at the angles of a triangle, the support being carried at one of said points by a joint having a universal action and being spring supported at the other points, substantially as and for the purpose specified.

3. In an agricultural machine, a frame, an implement shiftable relatively to the ground, a support for the implement movably carried from the frame at three points arranged at the angles of a triangle, the support being carried at one of said points by a joint having a universal action and being spring supported at the other points, and manual means for moving the support about the axes of said joint, substantially as and for the purpose set forth.

4. In an agricultural machine, a frame, an implement, a support for said implement, the support being connected to the frame to move about forwardly and rearwardly, and laterally extending axes arranged at an angle to each other, means including springs tending to raise the support about both of said axes, and manual means for raising the support about both of said axes, substantially as and for the purpose described.

5. In an agricultural machine, the combination of a frame, an implement arranged to overlie the ground and being movable vertically toward and from the ground, a support for the implement connected to the frame by a joint movable about two axes, one extending forwardly and rearwardly, and the other laterally, and springs carrying the support, one tending to lift the support about one of said axes and the other to lift the support about the other of said axes, substantially as and for the purpose specified.

6. In an agricultural machine, the combination of a frame, an implement arranged to overlie the ground and being movable vertically toward and from the ground, a support for the implement connected to the frame by a joint movable about two axes, one extending forwardly and rearwardly, and the other laterally, and springs carrying the support, one tending to lift the support about one of said axes and the other to lift the support about the other of said axes, and manual means for lifting the support about one of said axes, substantially as and for the purpose set forth.

7. In an agricultural machine, a frame, an implement, a support for said implement engaging the same near one end thereof, the support being connected at one end to the member and at its other end to the frame to move about two axes at an angle to each other, one axis extending in a direction substantially parallel to said member, the other axis extending in a direction at an angle to one end of said member, and means for carrying the support including springs, one of said means being connected to the support substantially in the plane of the last mentioned axis, the other being connected to the support substantially in the plane of the first mentioned axis, substantially as and for the purpose described.

8. In an agricultural machine, a frame, a finger bar extending laterally, a support for the finger bar, the support being connected to the frame at its rear end by a joint movable about two axes, one extending forwardly and rearwardly, and the other laterally, and the support being connected at its front end to one end of the finger bar, means carrying the support including a spring connected to the support at a point remote in a lateral direction from said joint, and means carrying the support and connected thereto at a point remote from the joint in a lengthwise direction, substantially as and for the purpose specified.

9. In an agricultural machine an implement including a laterally extending cutting member, a support for said member pivoted at one end to one end of said member on a horizontal axis extending lengthwise thereof and at its other end to the frame by a joint movable about an axis substantially parallel to the former axis and about an axis extending in a direction at an angle to said former axis, and means carrying and raising and lowering the support including a lever carried by the frame, a link connected to the support, the support and link being connected together by a universal joint, substantially as and for the purpose set forth.

10. In an agricultural machine, a frame, an implement shiftable to different elevations relatively to the ground, a support movably connected to the frame to lift the implement, the implement being movably connected to its support, means for shifting the support to elevate the implement, means operated by the former means for moving the implement during the raising and lowering of the support, the latter means being also operable independently of the former means to change the position of the implement relatively to its support, substantially as and for the purpose described.

11. In an agricutural machine, a frame, an implement shiftable to different elevations relatively to the ground, a support pivotally connected to the frame, the implement being pivoted to the support on an axis substantially parallel to the pivotal axis of the support, means for shifting the support about its pivotal axis, and means operated by the former means for shifting the implement about its axis during the pivotal movement of the support, the latter means being operable independently of the former means to shift the implement about its axis relatively to the support to change the angle thereof relatively to the work, substantially as and for the purpose specified.

12. In an agricultural machine, an implement including a laterally extending cutting member, a support for said member pivoted at one end to one end of the cutting member on a horizontal axis extending lengthwise of the cutting member, and at its other end to the frame by a joint movable about an axis substantially parallel to the former axis and about an axis extending in a direction at an angle to said former axis, means carrying and operating the support, and means for shifting the cutting member about its axis during the lifting of the support, including a lever mounted on an axis extending parallel to the transverse axis of said joint, a lever arm rigid with the cutting member and a link connecting said lever and the lever arm, substantially as and for the purpose set forth.

13. In an agricultural machine, a frame, an implement shiftable relative to the frame, a support carried by the frame, spring means yieldingly carrying the support and a lifting lever operating to relieve the spring of some of the weight of the support and permit the spring to lift the support, and means arranged to form a positive and unyielding connection between the support and the frame to positively lift the support when the lever has been operated to lift the support and the spring fails to correspondingly lift the support, substantially as and for the purpose described.

14. In an agricultural machine, a frame, an implement shiftable relatively to the frame, a support for the implement movably carried by the frame and movable about longitudinal and transverse axes, springs carrying the support about such axes, the support being also movable about a transverse axis inclined relatively to the former transverse axis, and means for positively lifting the support, and means for causing the support to move about said inclined axis during the lifting of the support, substantially as and for the purpose specified.

15. In an agricultural machine, a frame, an implement shiftable relatively to the frame, a support for the implement carried by the frame, a spring yieldingly carrying a portion of the support, a lever for lifting another portion of the support and a fulcrum arranged to coact with the support after the lever has been operated to lift said support and the spring fails to correspondingly lift the support, substantially as and for the purpose set forth.

16. In an agricultural machine, a frame, an implement shiftable relatively to the frame, a support for the implement movably carried by the frame at three points arranged at the angles of a triangle and being movable about two axes arranged at an angle to each other, the lever tending to move the support about one of said axes to lift the support, a spring acting in conjunction with the lever to move another portion of the support during the operation of the lever and a fulcrum arranged to engage the latter portion of the support and cause the support to move about an axis passing through the fulcrum when said spring fails to lift the support during the lifting operation of the lever, substantially as and for the purpose described.

17. In an agricultural machine, a frame, an implement shiftable relatively to the frame, a support for the implement movably carried by the frame at three points arranged at the angles of a triangle, the support being carried at one of said points by a joint having a universal action and springs carrying the support at the others of said points, a lever for positively lifting the support at one of the spring carried portions thereof, and a fulcrum arranged to coact with the support near the other of said spring carried portions when the lever has been moved a predetermined distance, substantially as and for the purpose specified.

In testimony whereof, I have hereunto signed my name, at Syracuse, in the county of Onondaga, and State of New York, this 5th day of July, 1918.

ALEXANDER T. BROWN.